United States Patent Office 3,077,140
Patented Feb. 12, 1963

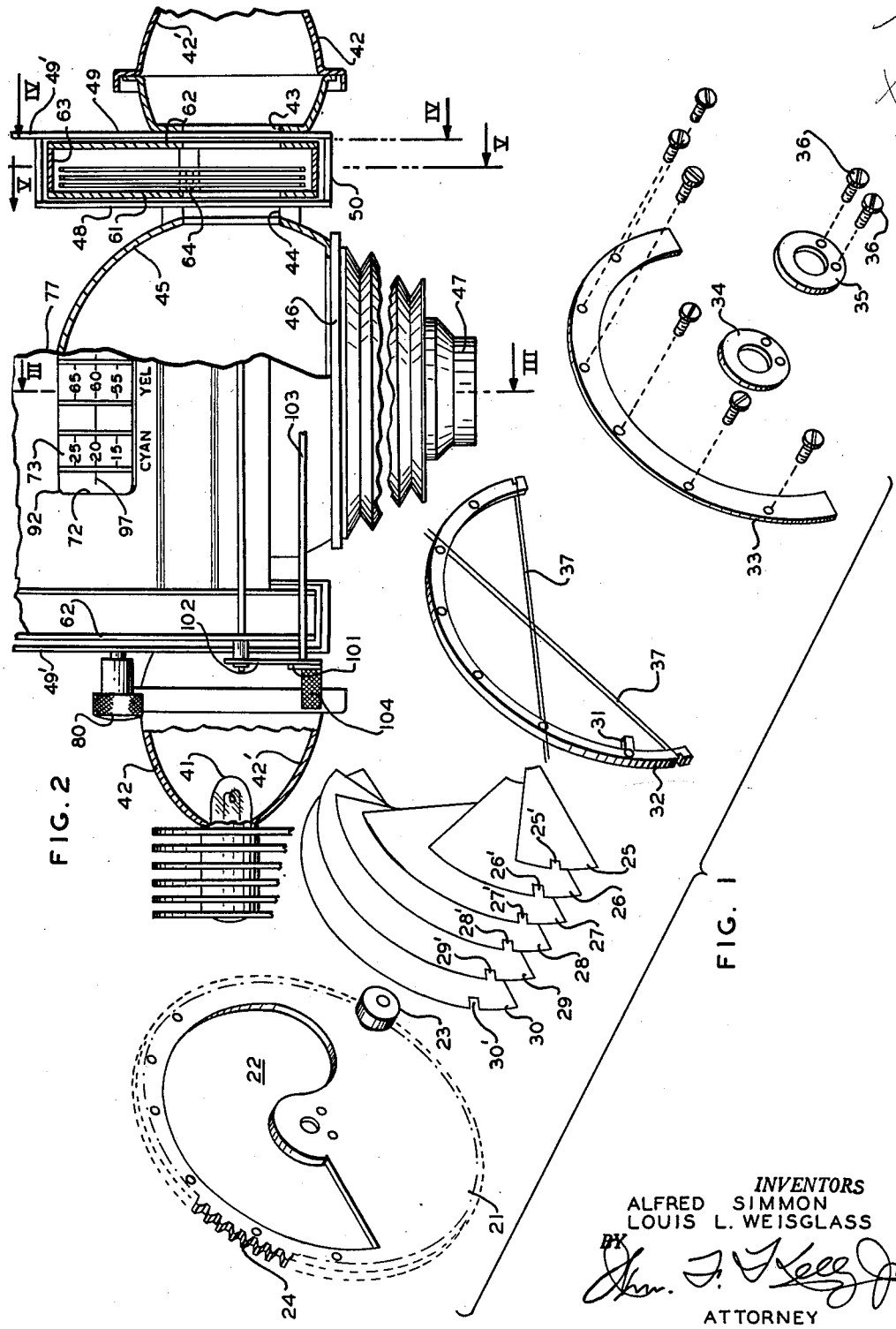
Feb. 12, 1963 — A. SIMMON ETAL — 3,077,140
COLOR FILTER DEVICES FOR PHOTOGRAPHIC PRINTERS AND ENLARGERS
Filed Feb. 17, 1960 — 5 Sheets-Sheet 1
INVENTORS
ALFRED SIMMON
LOUIS L. WEISGLASS
ATTORNEY

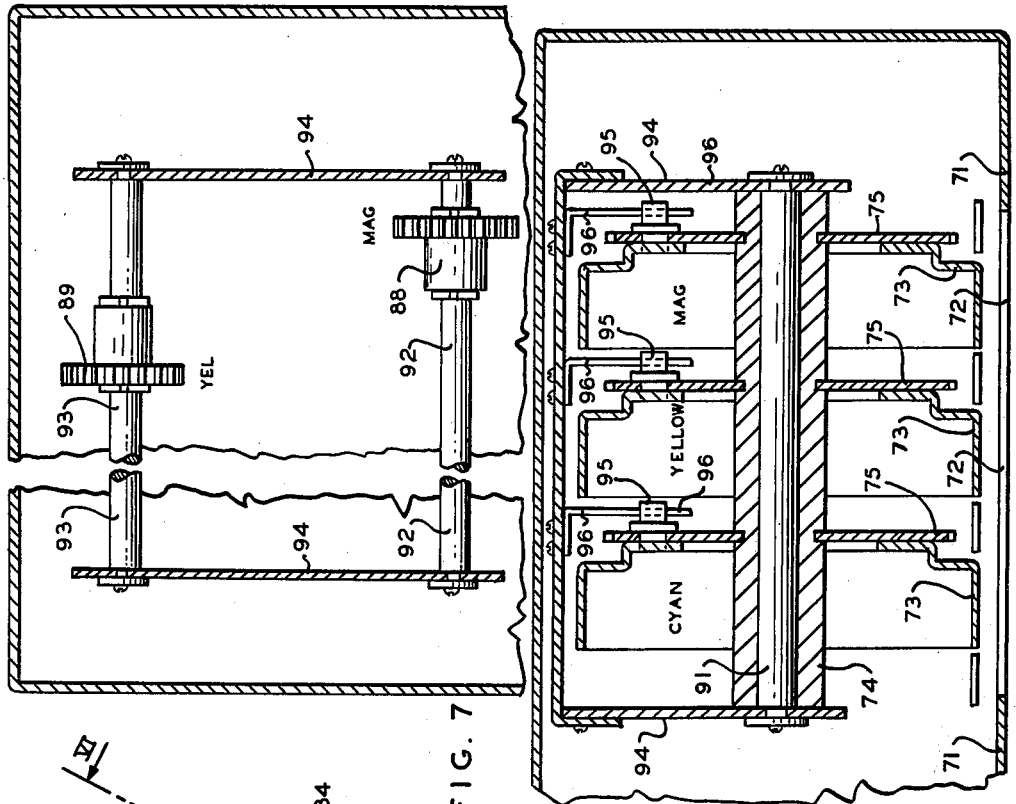
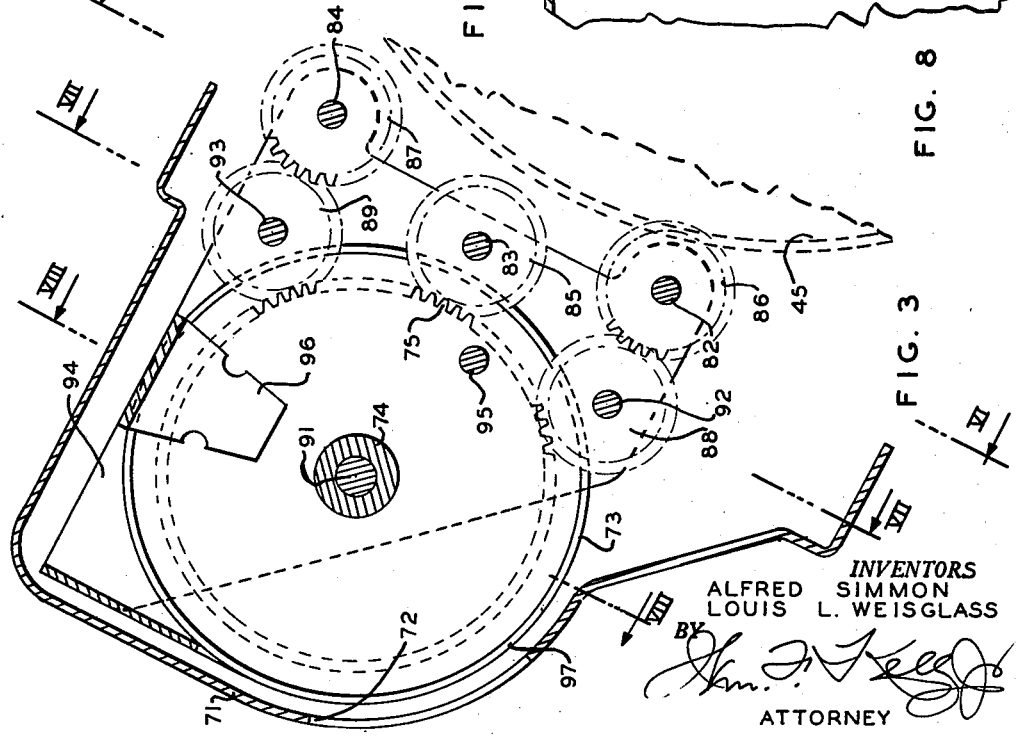

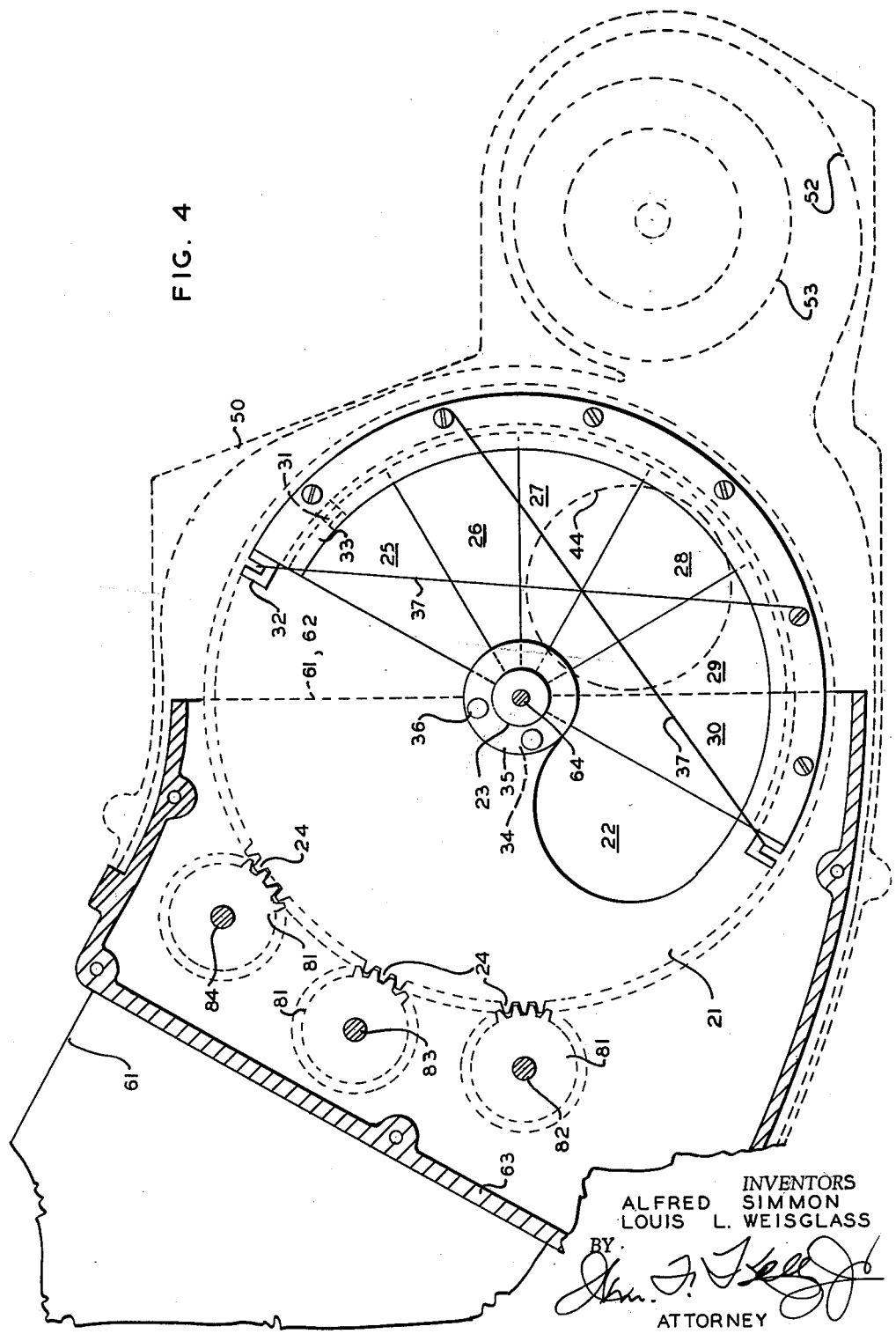

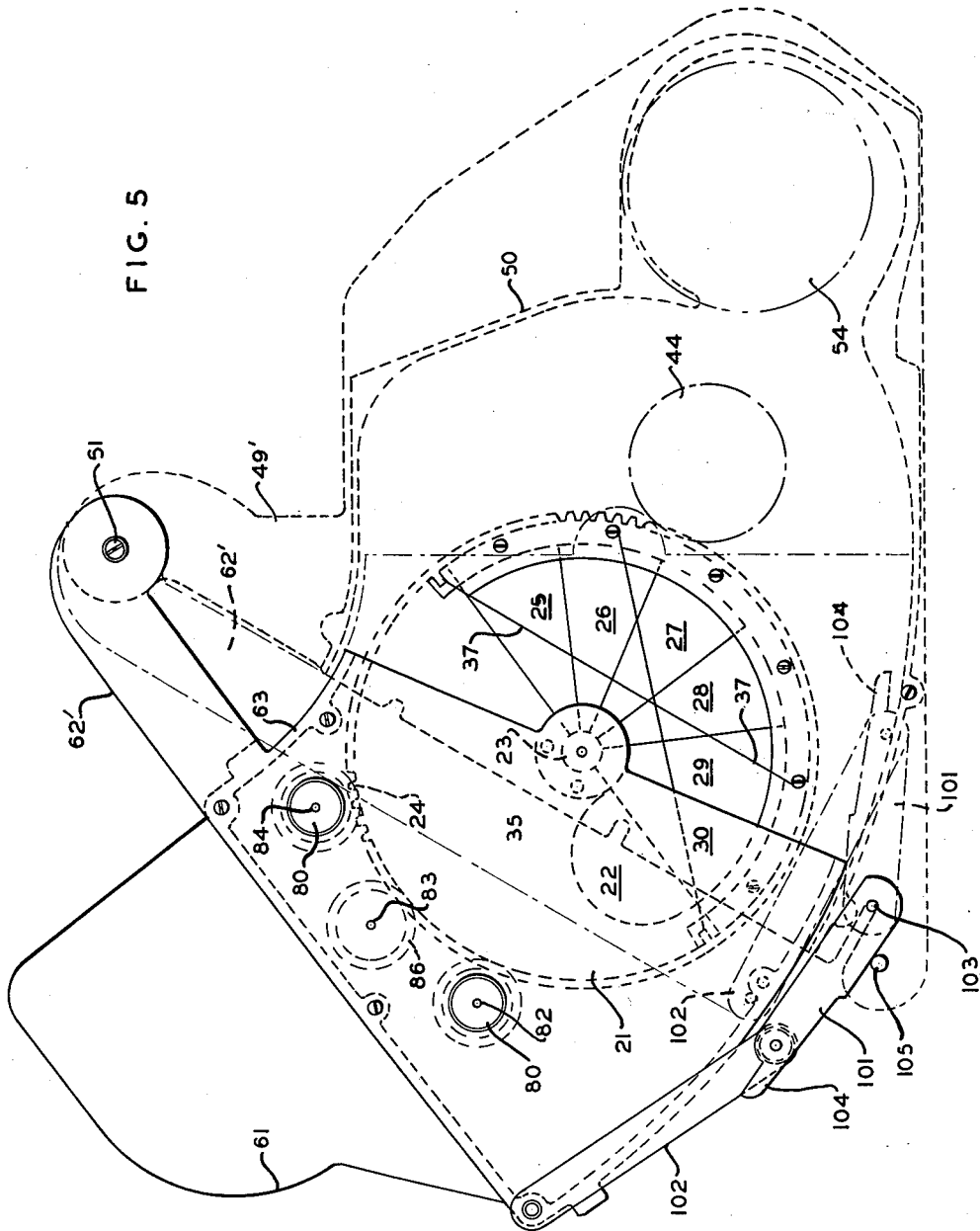
FIG. 5
INVENTORS
ALFRED SIMMON
LOUIS L. WEISGLASS
BY
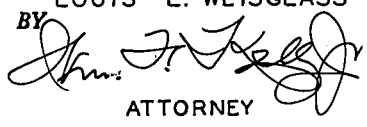
ATTORNEY

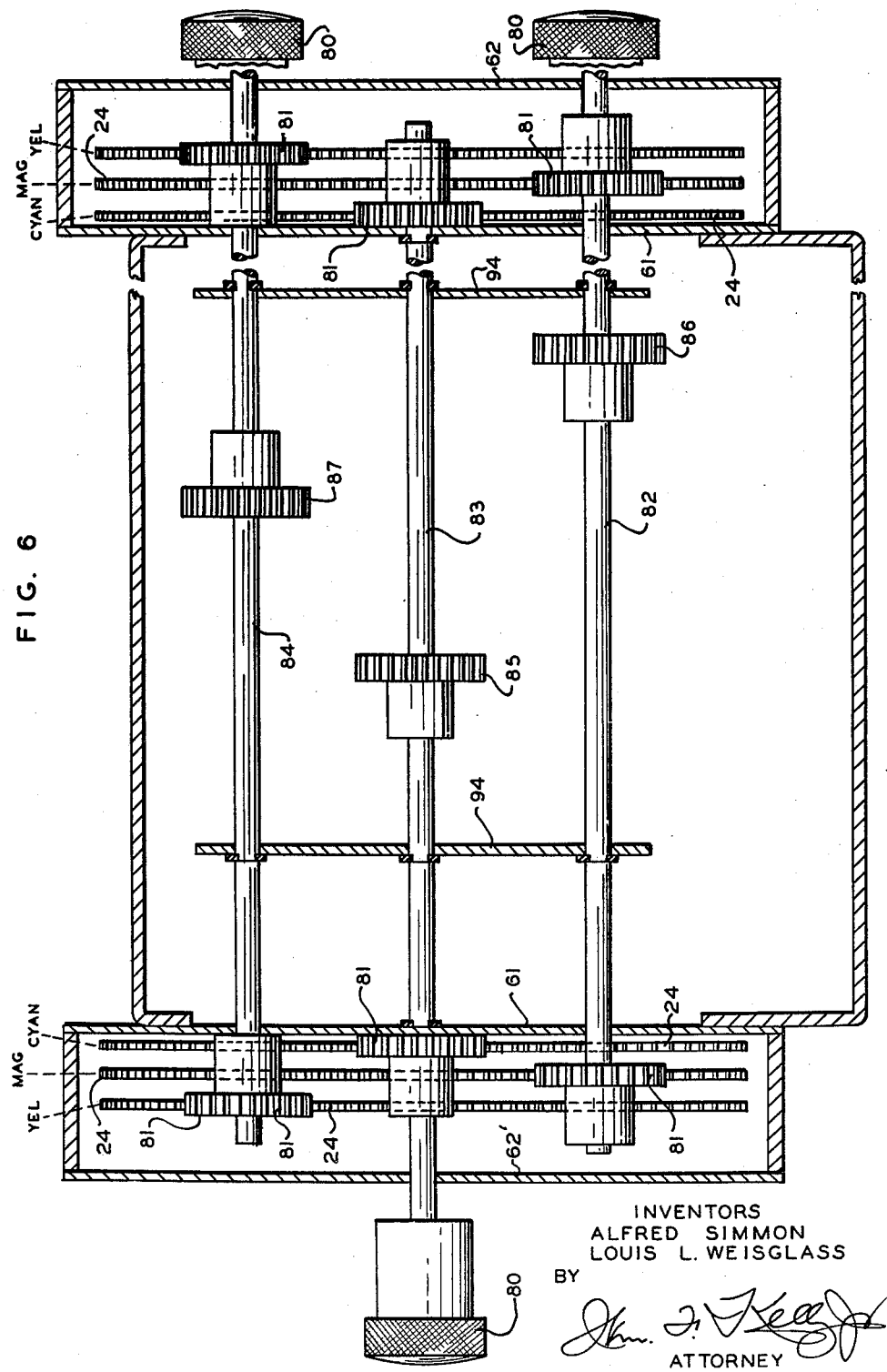

3,077,140
COLOR FILTER DEVICES FOR PHOTOGRAPHIC PRINTERS AND ENLARGERS
Alfred Simmon, Garden City, and Louis L. Weisglass, New York, N.Y., assignors, by mesne assignments, to Simmon Brothers Inc., New York, N.Y., a corporation of New York
Filed Feb. 17, 1960, Ser. No. 9,275
7 Claims. (Cl. 88—24)

This invention relates to a color filter device for photographic printers and enlargers. More particularly, the invention relates to an illuminating system provided with means for making changes in the color tone or spectral composition of the light employed for making copies or enlargements from colored negatives or originals. It concerns photographic copying and enlarging apparatus wherein the light from a copying lamp is collected by means of a light-collecting reflector and then conducted through a color filter arrangement to an integrating chamber or approximate sphere, before it is transmitted for illuminating the original.

Whenever colored transparencies that are to be copied display an overall off-color tone, it is customary to try to remove such imperfections by the use of a correcting filter in the copying or enlarging operation. Filters having the desired color characteristics have been inserted in the path of light coming from a copying lamp in such a manner that the entire light bundle was colored, or rather that light rays of certain wavelengths were filtered out of white or almost-white copying light. It was, however, necessary to use a special filter for each color density, so that many correction filters were required to meet various types of color imperfections encountered in practice.

An object of our invention is, therefore, to simplify and improve the filter arrangement for such copying and enlarging apparatus and to reduce the number of correction filters required for the operation, including the provision of means for adjusting the densities of the individual color filters at will, with indicating means or scales for showing the extent of that adjustment.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is an exploded view of a filter assembly embodying our invention,

FIGURE 2 is a fragmentary elevational view of a photographic enlarger or copier embodying our invention, FIGURE 3 is an enlarged fragmentary vertical transverse sectional view on the line III—III of FIGURE 2, in the direction of the arrows, FIGURE 4 is an enlarged vertical transverse sectional view on the line IV—IV of FIGURE 2, in the direction of the arrows, FIGURE 5 is an enlarged vertical transverse sectional view on the line V—V of FIGURE 2, in the direction of the arrows, showing in full lines the filter assembly removed from operative position and indicating in dotted lines its position when returned to operative position in the path of light, FIGURE 6 is a longitudinal sectional view on the line VI—VI of FIGURE 3, to the same scale and in the direction of the arrows, FIGURE 7 is a longitudinal sectional view on the line VII—VII of FIGURE 3, in the direction of the arrows, FIGURE 8 is a longitudinal sectional view on the line VIII—VIII of FIGURE 3, in the direction of the arrows.

The apparatus embodying our invention is applicable to enlargers and copiers in which the light used undergoes a constriction before it is—with substantially uniform intensity—distributed over the area of a negative or transparency. A preferred type of such an enlarger has been described in detail in the pending application of Alfred Simmon, Serial No. 792,152, filed February 9, 1959, one of the present joint applicants and which application is assigned to the same assignee as the present invention. In that application, as well as elsewhere in the prior art, the intensity of the light of each of the primary colors is controlled by a single filter of uniform density and of the corresponding complementary color, which is inserted more or less into the light beam at or near the plane where it is constricted. As distinguished from this, we are here using rotatable stepwedges of a novel construction in conjunction with a novel structure and actuating mechanism, which has the following advantages:

(1) In any position of the filters, predictable results are obtained which can be duplicated with accuracy.

(2) These results can be indicated by discs or scales with uniformly spaced divisions. These scales can be easily and accurately constructed without resorting to empirical tests.

(3) The color distribution over the entire area of the projected image becomes almost completely uniform with only a negligibly small error, much smaller than previously attainable with a single filter.

(4) The filters cause a minimum of light loss because the colored sheets, i.e. the filters proper, are no longer sandwiched between transparent carriers, made from glass or acrylic plastics.

(5) The life expectancy of the color filters is much greater than that of a single filter, since, by the laws of probability, exposure to intense light is distributed over several sections of the stepwedges.

(6) The invention comprises a mechanism by means of which the entire filter assembly may be bodily removed from its place in the light beam, whereby the brightness of the projected image is increased for better observation by the operator during the operation of focusing. The filters may then be reinserted into the light beam, their adjustment remaining undisturbed during removal and reinsertion.

A device built according to this invention comprises color filters and a supporting structure, including filter actuating means. The color filters are essentially rotary stepwedges. Its principal parts are the color filters proper, and the rotatable disc structure.

Referring to the drawings in detail and first considering FIGURE 1, the color filters proper are desirably made from plastic sheet material such as gelatin or acetate, containing suitable organic dyes. They are of a configuration which may be called truncated sectors, each having an inner radius, an outer radius and covering increasing multiples of a suitable angle. For example, if the angle of the first sector is $\phi$, the angle of the second sector is $2\phi$, etc., and the angle of the last sector is $n\phi$, where $n$ is the number of sectors or steps of the wedge. All sectors are generally stamped from the same sheet so that the relative densities of the different steps are bound to be accurately known, which is not always the case when one combines several filters of different densities. The filter sectors are respectively designated 25, 26, 27, 28, 29 and 30. Each sector is equipped with at least one keyway, respectively designated 25', 26', 27', 28', 29' and 30'.

The main part of the rotatable disc structure is a circular disc 21, stamped from durable material such as sheet aluminum or the like, desirably black anodized or otherwise covered with a coating of low reflectivity. This disc 21 carries gear teeth 24 on its circumference and has a curved or partly annular aperture 22 with an inner radius and an outer radius. Said outer radius is somewhat smaller than the outer radius of the filter sectors.

As it is usually desired to provide for zero density, the aperture preferably covers an angle of $(n+1)$ $\phi$, i.e. it is larger than the widest filter sector, so that a portion of the aperture 22 remains open, not being covered by any filter. This is illustrated as the portion of the aperture at the extreme right end, which may be rounded off as shown. The remaining parts of the rotatable disc comprise a resilient washer 34 made from rubber or the like, a rigid washer 35 made from steel or some other durable metal, and screws 36 adapted to tighten the washer 35 relative to the dis 21, thereby compressing the washer 34, a spacer 32 and a retainer 33.

The outer radius of the hub 23 is substantially the same, or a little smaller, than the inner radius of the filter sectors. The outer radii of the washers 34 and 35 are desirably substantially identical with the inner radius of aperture 22.

The outer radii of spacer 32 and retainer 33 are both desirably substantially equal to the outer radius of disc 21 inside of the roots of the gear teeth. The inner radius of the retainer 33 is substantially the same as the outer radius of aperture 22. The inner radius of the spacer 32 is slightly larger than the outer radius of the filter sectors, and also is larger than the outer radius of aperture 22, and the inner radius of retainer 33. Finally, the spacer 32 is slightly thicker than the combined thickness of all of the filter sectors 25 to 30, inclusive.

The combination of the elements just described and their dimensions as set forth makes it possible to clamp the inner portions of the filter sectors 25 to 30, inclusive (i.e. the filters proper) rigidly between rubber washer 34 and the inner portion of disc 21 which is close to the hub 23. The outer portions of said filter sectors, however, are rather loosely retained between the outer portion of disc 21 (i.e. its rim), and the retainer 33. In consequence of this "floating" arrangement, the filter sectors are free to expand or contract under the influence of changes in temperature or humidity, as plastic materials usually do.

In order to secure a more positive angular alignment of the filter sectors, the spacer 32 is equipped with a tongue or key 31 which is rather loosely received in the keyways 25' to 30', inclusive, in the outer peripheral portions of the filter sectors 25 to 30, inclusive, when assembled therewith.

While the floating arrangement of the outer portions of the filter sectors is, in most instances, sufficient to prevent warping, we have observed that in a few cases some filters may sufficiently distort to come in contact with either one of the adjacent filters or with one wall of the housing. In order to prevent this, we have stretched a few thin wires 37 across aperture 22, desirably with some of said wires to one side or in front, and others to the other side or in back, of the filters. These wires absorb only an extremely small amount of light and definitely restrict any undesired filter movement parallel to the axis of the assembled filter wheel.

The filter wheel assembly is illustrated in FIGURES 4 and 5. These figures show clearly that a rotatable stepwedge is formed beginning at one edge with a portion of zero density, and progressing counterclockwise through portions of density D, 2D, 3D, etc. and finally to a density $nD$, where D is the density of a single layer of colored plastic or other sheet.

A preferred type of photographic enlarger, or more specifically, its illuminating system, which is to be equipped with a device built according to the present disclosure is illustrated in FIGURES 2 to 8, inclusive. Since the design of such an enlarger is the subject of the pending application, Serial No. 792,152, previously herein referred to, only those parts and features will be mentioned which are essential for an understanding of the present invention.

The illuminating system of this enlarger, as can be seen in FIGURE 2, comprises one or several sources of light 41, two sources being illustrated in the present example. As the light-controlling structure at the right and left ends of the enlarger are identical, only one will be described in detail. The source or each source 41 is surrounded by a light-collecting specular reflector 42 which, by virtue of its peculiar configuration, causes most of the light emitted by lamp 41 to pass through an aperture 43. In fairly close proximity to the aperture 43 and in juxtaposition thereto is aperture 44 through which light enters an integrating chamber 45, generally spherical in shape. The interior surface of this chamber 45 is coated with a non-glossy, diffusely reflecting white paint. By multiple diffuse reflection within this chamber the light is directed to and substantially uniformly distributed over the area of a negative or transparency which may be placed on a horizontal negative stage 41. A conventional enlarging lens 47 projects an, usually enlarged, image of the negative, in the usual manner, upon a sheet of sensitized material.

A housing or pocket is arranged between apertures 43 and 44, adapted to accept part of the filter supporting structure, to be described, including a set of color filters or rotatable stepwedges of the type embodying our invention. This pocket is formed by two plates 48 and 49, which are connected by a part 50 of peculiar shape, illustrated in FIGURES 4 and 5 in dotted lines, which is preferably manufactured from extruded aluminum or the like. One of the plates, such as 49, has an upright extension 49' and, in the example which comprises two lamp assemblies, the two corresponding extensions 49' are connected by a cylindrical bar 51, shown in FIGURE 5. A scroll 52 is formed in the extreme right end portion of this pocket (FIGURE 4) which accepts a blower wheel 53 which may be driven by a small motor 54, schematically shown in FIGURE 5. The output of this blower cools the filters as well as a sheet of heat-absorbing glass (not shown) which is desirably placed in front of aperture 43.

The supporting structure for the filters comprises one or several housings or pockets for filter wheels and one housing for devices indicating the position of said filter wheels. The number of filter housings is determined by the number of light sources in the illuminating system of the enlarger, and the number of filter wheels within each housing or pocket depends on the number of primary colors for which the color process is designed. In the drawings, we have shown an enlarger with two lamps, and consequently two filter housings have been arranged, one in front of each lamp and reflector assembly. The device, as shown, is designed for a 3-color system, and therefore each filter housing contains three filter wheels, the colors of the filters being complementary to the primary colors red, green and blue; i.e. cyan, magenta and yellow.

Each filter housing comprises two side plates 61 and 62, which are joined by a part 63 which again is preferably an aluminum extrusion, see FIGURES 2 to 5, inclusive. The shape of plate 61 is such that its upper part forms one sidewall of the housing for the indicator device, to be later described. Plate 62 has an extension 62' which engages the already-mentioned cylindrical bar 51. A stationary shaft 64 of relatively small diameter is jointly supported by both plates 61 and 62 and carries, in turn, three filter wheels. As can be seen in FIGURES 4 and 5, approximately one half of each wheel is disposed within, and the remainder outside of the filter housing.

We provide an indicator housing comprising two sidewalls formed by the already-mentioned upper portions of plates 61 and a connecting plate 71 which forms the front, top and rear walls of said housing. The front wall has a generally rectangular window 72 through which the operator can observe the indicating dials. Referring to FIGURE 8, these dials are short cylinders 73 with hubs 74, each carrying a spur gear 75. Inscribed on the outside of these cylinders are scales with uniformly spaced divisions which denote filter density values. Portions of these scales are visible through window 72, as illustrated in FIGURE 2.

As has been explained, the filter wheels 21 carry gear teeth 24 on their outer peripheries. These teeth mesh with gears 81 of smaller radii (FIGURES 3 to 5, inclusive) and which are axially spaced as shown in FIGURE 6. These gears are mounted on long shafts, 82, 83 and 84, and in the present embodiment, there are two connected filter wheels for each color, one within each pocket, and may be rotated in unison by the operator, using one of the knurled knobs 80. Two of these knobs are at the right, and one is at the left side of the device. (See FIGURES 2 and 6.)

The shaft 83 (in the center) carries another small gear 85 which is, in turn in mesh with one of the dial-actuating gears 75. The two other shafts 82 and 84 also carry small gears 86 and 87 which respectively operate the two other dial-housing gears 75 through idler gears 88 and 89. Since by this arrangement the two filters in each pocket rotate in one direction, and the third filter in each pocket rotates in the opposite direction, each pocket contains two filter wheels assembled right hand and one assembled left hand, or vice versa.

The three cylindrical filter dials 73 or, more precisely, their hubs 74, rotate about a common shaft 91. This shaft and the shafts 92 and 93, for the idler gears 88 and 89, are supported by two brackets 94, which are in turn supported by the already-mentioned shafts 82, 83 and 84 which are rotatingly disposed therein. The disclosed "floating" arrangement makes accurate alignment of numerous bearings unnecessary. The rotation of the dials 73 is limited to less than one revolution by pins 95 and stops 96 which are in the path of said pins and which are attached to brackets 94. These brackets also carry stationary marks 97 which coact with the scales of the cylindrical dials 73.

Referring to FIGURE 5, the extensions 62' of the side walls 62 of the indicator housing are pivoted on the cylindrical bar 51 which is part of the enlarger. Each of the filter housings or pockets is slightly narrower than the pocket of the enlarger between light collecting reflector and integrating chambers, and its shape, as determined by the extrusion 63, is such that it fits telescopically, with a small clearance, into the above-mentioned pocket of the enlarger which has a shape determined by another extrusion 50. It thereby becomes possible to lift the entire filter supporting structure with all filter wheels by rotating or swiveling it around bar 51 as an axis. This moves it from the position shown in FIGURE 2 (in which the filter wheels intercept the light beam between apertures 43 and 44) to the position shown in FIGURE 5 (in which said light beam is substantially unobstructed).

A simple device to arrest and hold the entire filter supporting structure in its open or elevated position may be made, for example, by two levers 101 and 102. Said levers form a linkage which may be either folded, as shown in dotted lines in FIGURE 5, or extended beyond its dead center where it engages stop means 105, as shown in full lines in said figure. Two sets of these levers are provided, one set on either side of the enlarger, and corresponding levers 101 are connected by a long shaft 103 which rests in a slot in side plate 49 of the enlarger. A handle 104 on the part 101 serves as a crank to render the manipulation of this mechanism more convenient.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. Illuminating apparatus for adjusting the color of light and directing it through a photographic negative or the like comprising a source of light, a light collecting reflector for receiving the light and passing it on from said source, an outlet aperture in said reflector for passing said light, an integrating chamber with a diffusely reflecting interior surface, a receiving aperture in said chamber for light passing from said reflector through said outlet aperture, another aperture in said chamber for directing diffused light therefrom upon a negative or the like, a pocket through which light from said reflector passes on its way from said outlet aperture to said receiving aperture, and a color filter device in said pocket comprising color filters each formed of a primary complimentary color of uniform density and comprising coxial truncated sectors adjustably superimposable upon each other to preselect a predictable graduated density of the respective color filters, supporting structure, and means to operate said filters to selectively cause one or more of said truncated sectors to at least partially overlap another and produce different shades of color of the light from said outlet aperture or let it pass without interference through said receiving aperture.

2. Apparatus according to claim 1, wherein the filters are in the shape of truncated sectors, said sectors having an inner radius, an outer radius, a rotatable disc of circular shape, gear teeth at its circumference, an aperture in said disc, a hub, a clamping device, a spacer and a retainer, said aperture having an inner radius, an outer radius smaller than the outer radius of said filter sectors and covering an angle at least as large as that covered by the widest filter spacer, said hub having a radius substantially equal to the inner radius of said filter sectors.

3. Apparatus according to claim 2, wherein the filters are of uniform density and thickness, and the sectors progress as increasing multiples of a selected angle.

4. Apparatus according to claim 2, wherein the clamping device comprises one resilient and one rigid washer and at least one screw to compress said resilient washer between said disc and said rigid washer, the inner radius of said washers being larger than the radius of said hub and the outer radius of said washers being substantially equal to the inner radius of the aperture in said disc, said spacer being thicker than the combined thicknesses of all of the filter sectors, its outer radius being substantially equal to the outer radius of said disc at the root of the gear teeth, and its inner radius being larger than the outer radius of the aperture in said disc and larger than the outer radius of said filter sectors.

5. Apparatus according to claim 4, wherein said retainer has an outer radius substantially equal to the outer radius of said spacer and an inner radius substantially equal to the outer radius of the aperture of said disc and smaller than the outer radius of said filter sectors.

6. Apparatus according to claim 4, wherein there are thin wire means stretched across the disc aperture to restrict the axial movement of said filter sectors.

7. Apparatus according to claim 1, wherein said supporting structure includes a pocket adapted to accept a set of color filters, with a portion of each filter housed within and a portion extending outside of said pocket, said last-named pocket being smaller than but of a configuration substantially similar to that of said first-named pocket which is arranged between corresponding apertures of a light-collecting reflector and the integrating chamber, whereby said last-named pocket fits telescopically into said first-named pocket, and means under the control of the operator to change the relative position of the telescopically-fitting pockets whereby in one position the light beam between corresponding apertures of light collecting reflector and integrating chamber is intercepted by a color filter but remains substantially unobstructed in another position.

References Cited in the file of this patent

UNITED STATES PATENTS

| | | |
|---|---|---|
| 1,325,204 | Raleigh et al. | Dec. 16, 1919 |
| 2,300,970 | Reiss et al. | Nov. 3, 1942 |
| 2,416,919 | Goldsmith | Mar. 4, 1947 |
| 2,438,219 | Johnston | Mar. 23, 1948 |
| 2,867,916 | Birdseye | Jan. 13, 1959 |

FOREIGN PATENTS

| | | |
|---|---|---|
| 163,143 | Sweden | Apr. 29, 1958 |
| 15,678 | Great Britain | of 1912 |
| 663,250 | Great Britain | Dec. 19, 1951 |

OTHER REFERENCES

"Farbsteuerung des Kopierlichtes bei der Color-Kopie," Photo-Technik und Wirtschaft (German photographic magazine), vol. 7, July 1957, pages 320–1, Bild, FIG. 1 relied upon.